(12) United States Patent
Haugen

(10) Patent No.: US 8,991,937 B2
(45) Date of Patent: Mar. 31, 2015

(54) SOLUTION MINING METHOD WITH HORIZONTAL FLUID INJECTION

(71) Applicant: 101061615 Saskatchewan Ltd., Beechy (CA)

(72) Inventor: Harvey Haugen, Beechy (CA)

(73) Assignee: 101061615 Saskatcnewan Ltd., Beechy, Saskatchewan (CA)

( * ) Notice: Subject to any disclaimer, the term of this patent is extended or adjusted under 35 U.S.C. 154(b) by 0 days.

(21) Appl. No.: 13/970,288

(22) Filed: Aug. 19, 2013

(65) Prior Publication Data

US 2014/0354032 A1 Dec. 4, 2014

Related U.S. Application Data

(60) Provisional application No. 61/830,132, filed on Jun. 2, 2013.

(51) Int. Cl.
*E21B 43/28* (2006.01)
*E21B 7/00* (2006.01)

(52) U.S. Cl.
CPC .. *E21B 7/00* (2013.01); *E21B 43/28* (2013.01)
USPC .......................................................... 299/5

(58) Field of Classification Search
USPC .............. 299/3–6, 16–17; 166/259, 261, 266, 166/269, 271, 303, 306, 50
See application file for complete search history.

(56) References Cited

U.S. PATENT DOCUMENTS

| | | | |
|---|---|---|---|
| 2,161,800 A | 6/1939 | Cross | |
| 2,331,890 A | 10/1943 | Cross | |
| 3,612,608 A | 10/1971 | Manker et al. | |
| 4,192,555 A * | 3/1980 | Willett | 299/4 |
| 4,232,904 A | 11/1980 | Hurd | |
| 4,264,104 A | 4/1981 | Helvenston et al. | |
| 4,815,790 A | 3/1989 | Rosar et al. | |
| 5,246,273 A | 9/1993 | Rosar | |
| 5,431,482 A | 7/1995 | Russo | |
| 7,611,208 B2 | 11/2009 | Day et al. | |
| 7,857,396 B2 | 12/2010 | Bishop | |

FOREIGN PATENT DOCUMENTS

| | | |
|---|---|---|
| CA | 804945 | 1/1969 |
| CA | 832276 | 1/1970 |
| CA | 838477 | 4/1970 |
| CA | 942186 | 2/1974 |
| CA | 1113376 | 12/1981 |
| CA | 2666951 | 6/2010 |

OTHER PUBLICATIONS

Selim Ozsahin & W.H.W. Husband, An investigation of the Potential Solution Mining of Potash in Saskatchewan, Aug. 1965, cover pg. pp. 37-39, Engineering Division.

* cited by examiner

*Primary Examiner* — Sunil Singh
(74) *Attorney, Agent, or Firm* — Antoinette M. Tease

(57) ABSTRACT

An improved solution mining method for a soluble target layer such as potash, comprising injecting spent crystallizer brine unsaturated with salt generally horizontally into the top of the target layer to enable immediate target layer dissolution with waste salt accumulating in the sump while the dissolved target material is produced.

8 Claims, 6 Drawing Sheets

SOLUTION MINING METHOD WITH HORIZONTAL FLUID INJECTION

CROSS REFERENCE TO RELATED APPLICATION

This application claims priority back to U.S. patent application No. 61/830,132 filed on Jun. 2, 2013.

FIELD OF THE INVENTION

The present invention relates to solution mining methods.

BACKGROUND OF THE INVENTION

In-situ leaching, also called in-situ recovery or solution mining, is traditionally a process of recovering minerals such as copper and uranium through boreholes drilled into the deposit. The process initially involves drilling of holes into the ore deposit, while explosive or hydraulic fracturing may be used to create open pathways in the deposit for solution to penetrate. Leaching solution is pumped into the deposit where it makes contact with the ore. The solution bearing the dissolved ore content is then pumped to the surface and processed. This process allows the extraction of metals and salts from an ore body without the need for conventional mining involving drill-and-blast, open-cut or underground mining.

Conventional solution mines create individual caverns, usually by dissolving salt from beneath the ore body, then rubblizing the ore into the cavern and dissolving the ore in fresh water or dilute brines to form near saturated solutions at temperatures equal to the ore temperature (or slightly higher). Caverns tend to develop vertically and, in some cases, consideration has been given to connecting caverns. In order to collect the ore from the solution, crystallization systems are necessary at the surface.

Conventional solution mining systems have difficulty raising the mine temperature above the formation temperature, as well as obtaining fully saturated brines. Thus at the surface they raise the potash concentration and temperature in evaporators. This is a very high-cost part of the plant using large amounts of expensive and exotic metals. Large amounts of steam are also required in this process. The hot concentrated brines are then crystallized in evaporative crystallizers; these are limited to cooling to about 25 degrees C. One mine uses a system which takes the cooled brine to ponds, and makes use of natural cold crystallization in open ponds to add to plant recovery. This is still an expensive process requiring careful management and expensive dredging equipment. It also is seasonal with no potential to recover any heat.

Potash has been mined by solution mining techniques developed in the 1960s, as demonstrated at the Mosaic Belle Plaine Mine in Saskatchewan, Canada. The established method uses well pairs, from 50 to 80 meters apart.

In the predevelopment stage, water is pumped into the individual wells. Each well is equipped with a double casing. Water is pumped down the centre string, with brine returning up the annulus. When the caverns front each well connect due to dissolution of intervening materials, the water will then be pumped down one well and produced to surface through the second well to continue to wash out a salt cavern. This predevelopment cavern is commonly referred to as a sump and is located under the lowest potash bed. The water/brine is overlaid by oil or diesel fuel to prevent dissolving the overlying potash layer. The salt brine from this predevelopment stage is conventionally pumped to a deep well for disposal.

Primary mining commences after the sump is developed. Layers of the ore are broken into the sump (rubblized). In primary mining, preheated water is slowly pumped into the cavern to dissolve the potash and salt in the ore. When the brine comes to a desirable potash concentration (typically somewhere above 10% KCL and about 18% NaCl), water flow to the cavern is set (commonly at around 50 cubic meters per hour) to maintain this discharge concentration throughout the primary mining stage, until the whole ore layer is removed. The brine temperature corning from the well is close to the ore temperature since the low flow rate limits the amount of heat that can be added even if the feed water is very hot. The slow dissolution rate limits flow to and torn the cavern. A large scale mine will require as many as 40 well pairs, 2 per cavern (80 wells), at a given time.

While the brine is technically close to saturation, the potash level is lower than equilibrium, while the salt concentration is typically higher than at equilibrium conditions. In fact, the ratio of KCl to NaCl in the brine must be in the ratio of the KCl to NaCl ratio in the ore body since primary mining is generally defined as full dissolution of the ore. The unfavorable brine concentration requires that brine from the wells most be fed to expensive evaporators, then to crystallizers to recover the potash. Over 1 tonne of salt is produced in evaporation for each tonne of potash, and this salt is produced and stored on surface in large salt piles, with no end use.

About 30% of the production from a conventional solution mining operation is from secondary mining. A hot, NaCl saturated brine replaces the water feed used in primary mining. When the brine comes to near saturation, the new mixed KCl/NaCl brine from the mine is cooled in contact crystallizers or cooling ponds to produce the previously dissolved potash. This is an even slower process than with primary mining, and is seasonal when cooling ponds are used (only in cold winter weather).

It has long been suspected that if brine could be produced in the mine close to an equilibrated concentration, at elevated temperature (above 50 degrees C. but preferably closer to 80 degrees C.), this brine could simply be cooled in a crystallizer to produce a crystal potash product. This would eliminate, or at least minimize, the need for an expensive evaporation stage. It was believed that if the cold brine front the crystallizer is reheated and used for mine feed, only the potash will dissolve, while all the salt will be retained in the cavern and there will be no salt waste stored on surface.

Though this idea was wed established, every attempt to implement it resulted in very limited production lasting only days. The liberated salt quickly filled the lower portion of the cavern, and dissolution rates continued to decline. Most tests were run using saturated NaCl brine, since crystallizers were not included in the test facilities, and the NaCl saturated brines blinded off the deposit. Tests were also done on single wells with the feed brine going down the centre string, and potential production brine rising in the annulus. This limited circulation to the deposit, however, and made beating of the deposit very difficult since the hot feed was cooled by the returning production brine by beat exchange across the tubing wall.

There have been limited attempts to overcome the problems with the conventional solution mining method. One example is Canadian Patent No. 2,725,013, owned by the present assignee, which provides a novel solution mining method that has advantages over the conventional technique. It teaches a method for the use of curved flow patterns to allow extraction of the potash values while leaving the undesirable salt in the cavern. This, then, allows polythermic mining of potash using a simple plant with cooling crystallizers, centrifuge and dryer as primary equipment. Alternately, a cooling pond could be used alone or in combination with conventional crystallization equipment or wiped surface crystal liters.

What is needed is a simplified well layout that has advantages for large scale production, without evaporation equipment or salt tailings stockpiles at surface. An improved solution mining method is presented in the following.

SUMMARY OF THE INVENTION

According to a broad aspect of the present invention, then, there is provided a solution mining method for recovering a target material from an at-depth soluble target layer, the target layer comprising salt and the target material, the target layer overlying a salt layer, the method comprising the steps of:

a. drilling first and second spaced apart wells to a depth adjacent the salt layer;
b. injecting water under an oil blanket through each of the first and second wells into the salt layer, thereby dissolving a portion of the salt layer adjacent each well;
c. producing a resultant brine through an annulus of each well;
d. dissolving the salt layer until the dissolved portions connect to form an elongate sump between the wells and beneath the target layer, the elongate sump sized to receive a predetermined amount of liberated salt from the target layer;
e. producing the injected water and oil blanket to the surface;
f. cutting a well casing of the first well at a depth generally at the top of the target layer, thereby forming a cut end;
g. providing the cut end with lateral deflection means configured to direct injected fluids generally laterally into the target layer;
h. providing an injection brine unsaturated in salt;
i. heating the injection brine to a desired temperature;
j. injecting the injection brine through the first well and through the lateral deflection means to dissolve the target layer;
k. allowing the target layer to dissolve to form a target layer brine comprising the target material;
l. allowing waste salt to separate out of the target layer during dissolution;
m. allowing the waste salt to accumulate in the elongate sump;
n. producing the target layer brine through the second well; and
o. recovering the target material from the target layer brine at surface.

In some exemplary embodiments of the broad aspect, the target material is potash and the injection brine comprises spent crystallizer brine. The desired temperature is preferably in the range of 70 to 90 degrees C., and at least a portion of the injected brine comprises produced target layer brine from which the target material has been recovered. The produced target layer brine is preferably subjected to cooling in a crystallizer to recover the target material, the target material subsequently centrifuged and dried.

In further exemplary embodiments, the method comprises the farther steps of:

p. substantially dissolving the target layer adjacent the first well;
q. switching the second well to inject the injection brine and the first well to produce the target layer brine;

r. cutting a well casing of the second well at a depth generally at the top of the target layer, thereby forming a second cut end;
s. providing the second cut end with second lateral deflection means configured to direct injected fluids generally laterally into the target layer;
t. injecting the injection brine through the second well and through the second lateral deflection means to dissolve the target layer;
u. allowing the target layer to dissolve to form a target layer brine comprising the target material;
v. allowing waste salt to separate out of the target layer during dissolution;
w. allowing the waste salt to accumulate in the elongate sump;
x. producing the target layer brine through the first well; and
y. recovering the target material from the target layer brine at surface.

A detailed description of an exemplary embodiment of an improved solution mining method according to the present invention is given in the following. It is to be understood, however, that the invention is not to be construed as being limited to this embodiment.

BRIEF DESCRIPTION OF THE DRAWINGS

In the accompanying drawings, which illustrate an exemplary embodiment of the present invention.

Figure 1:
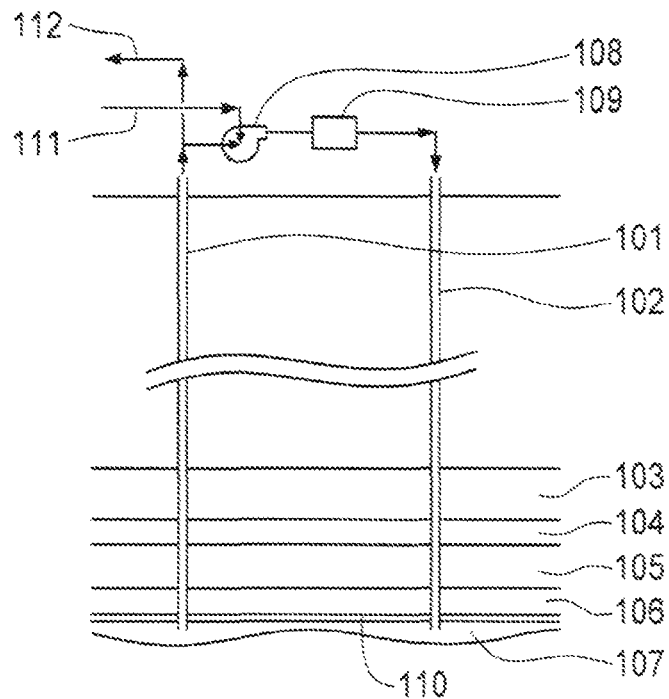
FIG. 1 is a simplified schematic view of an improved solution mining plan after initial sump development.

An exemplary embodiment of an improved solution mining method according to the present invention will now be described with reference to the accompanying drawings.

DETAILED DESCRIPTION OF EXEMPLARY EMBODIMENT

In the exemplary method according to the present invention, the sump will be developed using water to dissolve the salt, under an oil blanket, as in the current practice. However, the sump will be sized differently, with a new calculation used to size the cavern to handle ail the salt produced from mining the selected ore zone (zones) above the sump. The size of the sump will be determined based on a calculation of the total volume of ore above the sump that will be mined, the tonnage of salt in that ore, the anticipated bulk density of the liberated salt crystal, the tonnage of salt that will remain dissolved in the residual brine at the end of the mining period and what amount will be stored in the mined out target zone, and an allowance for cavern closure during the mining period.

The process changes from the conventional method at this point. Instead of using hot water for the mining fluid, a spent crystallize brine (mother liquor) is used. No blanket layer is used in the ore dissolution. A top down mining sequence will be used instead of a bottom up sequence. Ore will not be intentionally rubblized.

At the commencement of mining the cavern, the blanket layer used to develop the setup will be removed. One well casing will be cut just below the top of the ore interval located over the sump. The exact location will be set based on knowledge of the ore composition with preference given to a high grade potash layer with a minimum of insolubles.

A lateral deflection means will be provided in the end of the easing to deflect the brine horizontally into the ore. This device may include a Venturi to provide increased horizontal flow by incorporating cavern brine into the high velocity flow from surface. Alternately, the tube end can be sealed and the tubing perforated, preferably over a short interval and in vertical zones to give about 6 radial flows.

The mining sequence will use brine which will be specifically not saturated in NaCl. The feed brine will be crystallizer mother liquor. A small amount of water will be added to produce enough brine to replace the crystal dissolved in the mine. This slightly diluted brine is the only well feed used in the new mining system.

The mining system is quite different from conventional secondary mining. The feed brine is different in addition to the high circulation rate and temperature, the brine used is not saturated in NaCl, like in conventional secondary mining. This is important since a NaCl saturated brine would have to precipitate NaCl crystal in the deposit first, before it can dissolve KCl. This phenomena is well known to "plate out" both NaCl and KCl crystals in the ore with a NaCl layer, making the dissolution process very slow. The novel process is faster, in part, because of the brine chosen to feed the mine, whereas conventional secondary mining is very slow, for this and other reasons.

The brine flow will dissolve the KCl from the top of the selected zone, with the salt flowing back to the well bore, then down into the sump. As the salt piles up around the original well bore, the brine is forced against the original walls of the well, out under the ore bed, enlarging the well diameter and washing potash from the bottom of the ore deposit. Hot saturated brine will flow across the sump area, continuing to dissolve ore from the bottom of the deposit (the roof of the original sump), returning to surface via the second well. Since the salt, in saturated brine, has an angle of repose of less than 2 degrees, it will make good use of the sump area for storage.

The proposed dissolution system uses some additional novel equipment. A brine heating device and pump will be connected between the well pair (typically located on the well pad). This system will allow heating the cavern to any selected temperature. The reheated recycle stream along with the addition of the fresh feed from the plant ensures an undersaturated teed stream to the ore body. A high cavern temperature increases the solubility of KCl, as well as increasing dissolution rates. A higher brine discharge temperature facilitates potash production in cooling crystallizers.

The method will optimize dissolution conditions. It is well known that dissolution rates increase dramatically as the How rate increases over the crystal surface. The method uses forced circulation, in part by the addition of circulation pumps. The conventional system essentially uses convection flow (near zero flow) over the crystal. A conventional solution mine may use 35 caverns or more for a 2 million tpa production rate. With the improved dissolution rates made possible through the use of the right brine feed, higher flow, and elevated temperature, this could be reduced by as much as 70 to 80%.

In the potash mining sequence, the circulation will be set at a high level initially to bring the cavern temperature up to the design temperature. Actual design temperature will vary depending on mine depth, the maturity of the cavern development and other factors but will, in ideal circumstances, be in the range of 70 to 90 degrees C.

Figure 5:
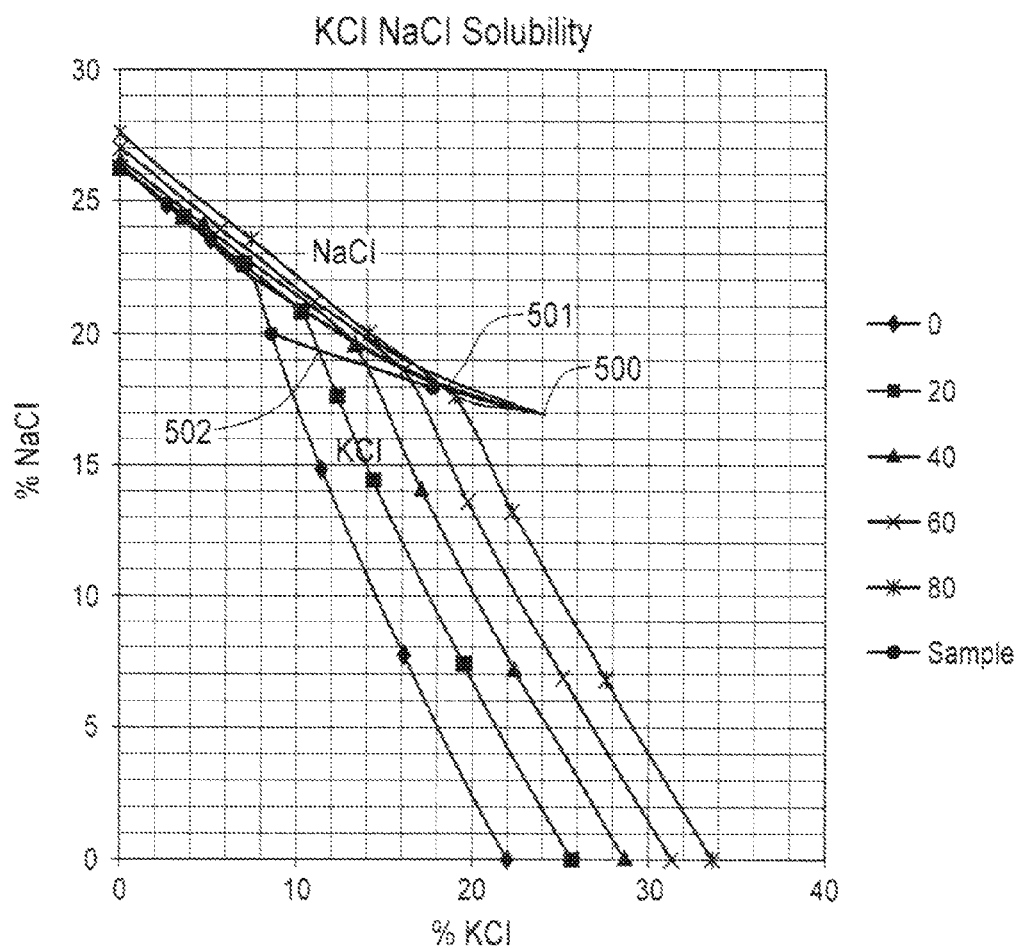
FIG. 5 is a chart illustrating KCl/NaCl solubility.

Once operating conditions are reached, a flow of feed brine (mother liquor) will be introduced to the circulation between the wells, with the surplus brine from the discharge well going to the plant as crystallize feed. The feed flow will be adjusted to maintain a suitable crystallizer feed brine concentration (near equilibrium concentrations, maybe 18% KCL, 18% NaCl). As the cavern develops, the recirculation rate will be reduced as the cavern reaches temperature and as feed and production brine flows are brought up to match the dissolution rate. The solubility of KCl and NaCl is shown in FIG. 5. The area above the curved line (500) represents concentrations of KCl and NaCl with only solid NaCl present, while the area below the line with only solid KCl. The line represents the equilibrium concentrations with both present. In ideal mining conditions, at 70 degrees C. the KCl concentration should be about 18% and the NaCl 18% (point 501). If this brine is cooled to 20 degrees C. the concentration of KG will drop to about 11% and the NaCl will rise to 20% (point 502). Note that the brine at this point is only saturated in KCl (no NaCl precipitates). This brine is reheated, contacted with the ore in the mine, and returns to the original point (501).

The amount of product from a single cycle can be increased by raising the mine temperature. At 90 degrees KCl goes up to 20.5%.

When the first potash zone around the first well is depleted, or at some optimal time, the second well casing will be cut a deflection device installed and the flow reversed to mine the area around the second well. This reversal can be repeated until the whole selected ore body is removed.

Where other high grade ore zones occur at other levels in the mine, the jetting action can be repeated according to the method described, to extract potash from these zones. Part of the liberated salt will be stored in the sump, the lower mined out areas, and near the end of the sequence, in the selected area being mined. One advantage of the method is that it allows the extraction of the high grade zones without breaking out the lower grade zones or thinner salt layers.

Brine will be cooled in conventional vacuum crystallizers, contact cooled crystallizers, cooling ponds or a combination of any or all of the above, all of which are well known, or currently being used in the industry. Product will be centrifuged and dried. Spent brine will be reheated and returned as new feed to the cavern.

Product will be sized on screens and compaction as is the current practice.

In another aspect of the invention, the heating and circulation system used in the production mode will be used in the predevelopment mode to increase the speed of salt dissolution in the initial sump development. Salt dissolution rates can also be increased with heat and circulation. The lateral deflection means described above would also improve the salt dissolution rate to produce the sump and even allow directional development, though care needs to be taken not to disrupt the oil blanket layer.

In another aspect of the invention, the individual caverns—that in a conventional solution mine would include two wells—would be extended as required to include third and fourth wells, extending to any number of wells in a line or staged pattern to form extended caverns. These caverns could extend parallel, radially or branched, in any convenient pattern to meet mine plan, with due consideration to mine structural stability.

The arrangement of multiple weds maximizes the use of available space in the mine for storage of waste salt, liberated as the potash is dissolved. It extends the heated area in the deposit progressively. Ultimately, the inflow in each of a series of wells provides a large surface area for dissolution of potash, and higher feed How rate from the plant, reducing the amount of recirculation required from the pod pump and heat exchanger system.

Typically, only one well will ultimately be used for production to surface (due to high flow requirements for a large plant more than one well may be used hut out of a sump or sumps close to the plant). This design using a long cavern or sump minimizes the length of pipeline back to the plant as the entire production flow is directed through the cavern to a well or wells close to the plant.

Turning now to the drawings, an exemplary embodiment of the improved mining method is illustrated in FIGS. 1 through 4. FIG. 1 shows the mine layout after the initial sump development. Hot water flows from the plant (111) to the circulating pump (108) along with part of the return flow from well (101) to a heat source (109). The heated mix is pumped down well (102) into the sump (107). The sump is overlaid by a diesel fuel layer (110) to prevent dissolution of the first potash ore layer (106). The salt brine produced as the sump is formed exits well (101) with the excess brine (112) and flows hack to the plant for deep well disposal. The lowest potash layer (106) is typically under a salt layer (105), which in turn has one or more potash and salt layers above it (potash 104 and salt 103).

Figure 2:
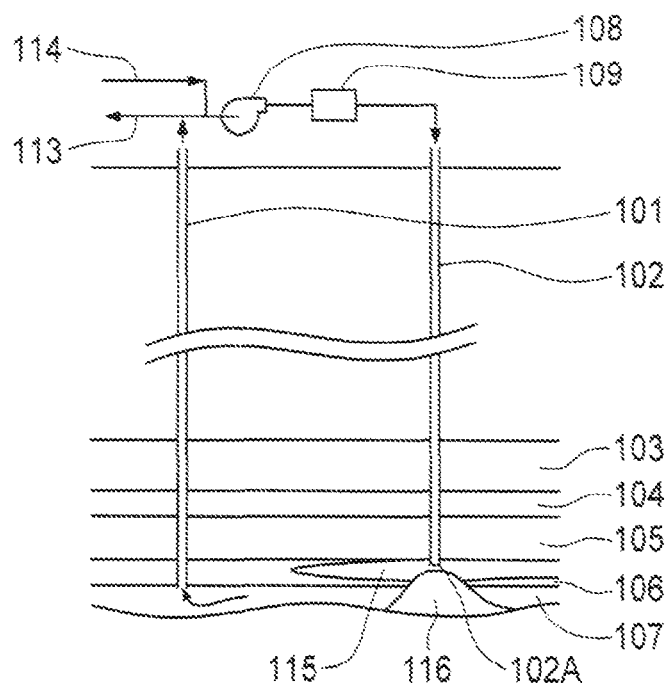
FIG. 2 is a simplified schematic view of the improved solution mining plan during the first stage of potash production.

FIG. 2 shows the first stage of potash production. Heated brine front the plant (114) is added to the circulating pump (108) along with circulated brine from well (101) to a heater (109) where the brine is typically heated to 80 to 90 degrees C. and pumped down well (102) through Venturi (102A) creating a cavern (115) in the potash layer (106). The potash is dissolved wife the liberated salt flowing out of the cavern to a pile of salt (116) in the sump (107). The near saturated brine flows through the sump to well (101) and returns to surface. A portion of the circulated brine (the excess of the feed brine less loss due to change in cavern volume) is drawn off as feed to the plant (113).

Figure 3:
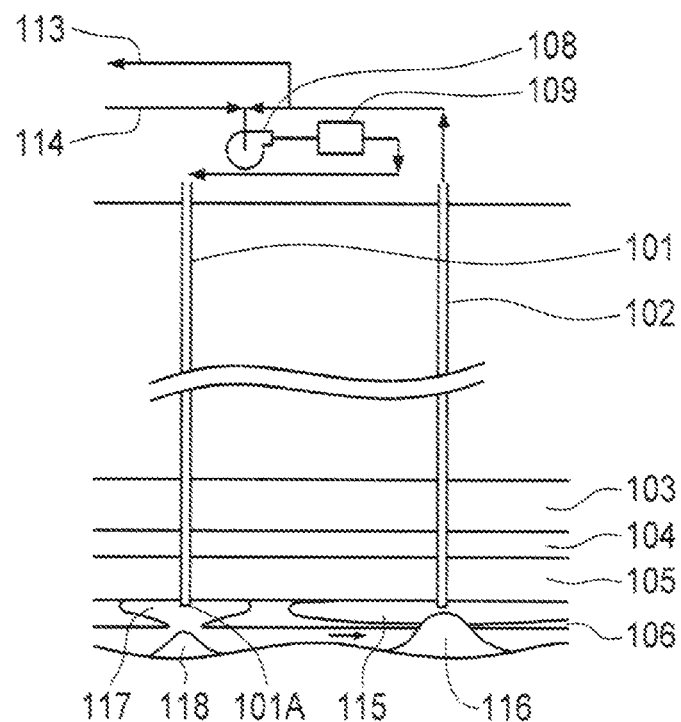
FIG. 3 is a simplified schematic view of the improved solution mining plan at flow reversal.

After most of the ore has been harvested from the first well (102) the flow is reversed, as illustrated in FIG. 3. The new feed well (101) casing is cut and a Venturi (101A) installed. The hot brine from the heat exchanger (109) is pumped down well (101) and through Venturi (101A) to form potash cavern (117) and salt pile (118). Hot saturated brine returns to surface on well (102), part going to the plant (113) and part to the recirculation pump (108).

Figure 4:
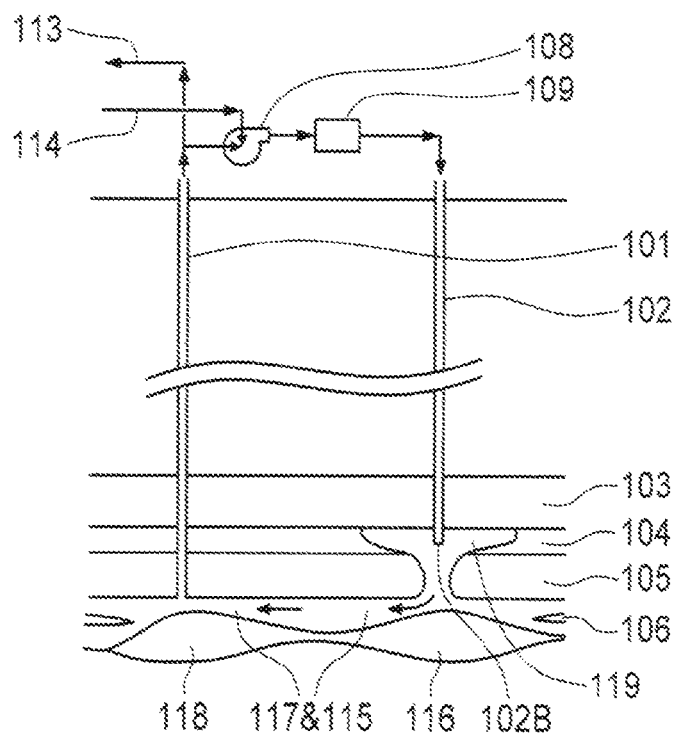
FIG. 4 a simplified schematic view of the improved solution mining plan when production moves to a second, upper layer.

At some point the ore is depleted from the primary potash layer (106) with all the liberated salt in the sump (116 and 118). The mining then moves to another potash layer (104), as illustrated in FIG. 4. One well (102) casing is cut to accept a new Venturi (102B). Hot brine is then pumped down well (102) with hot saturated brine returning through well (101). Liberated salt is deposited in the original sump and in the new volume created from the removal of the first ore layer (106). The procedure is repeated as for the first potash layer.

If other significant potash layers are available they can be mined as for the first two layers (106 and 104). At some point salt will fill the expanded sump area. If the second potash layer (104) is complete (working on third or fourth layers), salt will be stored in the open layer created by the previous mining activity.

Figure 8:
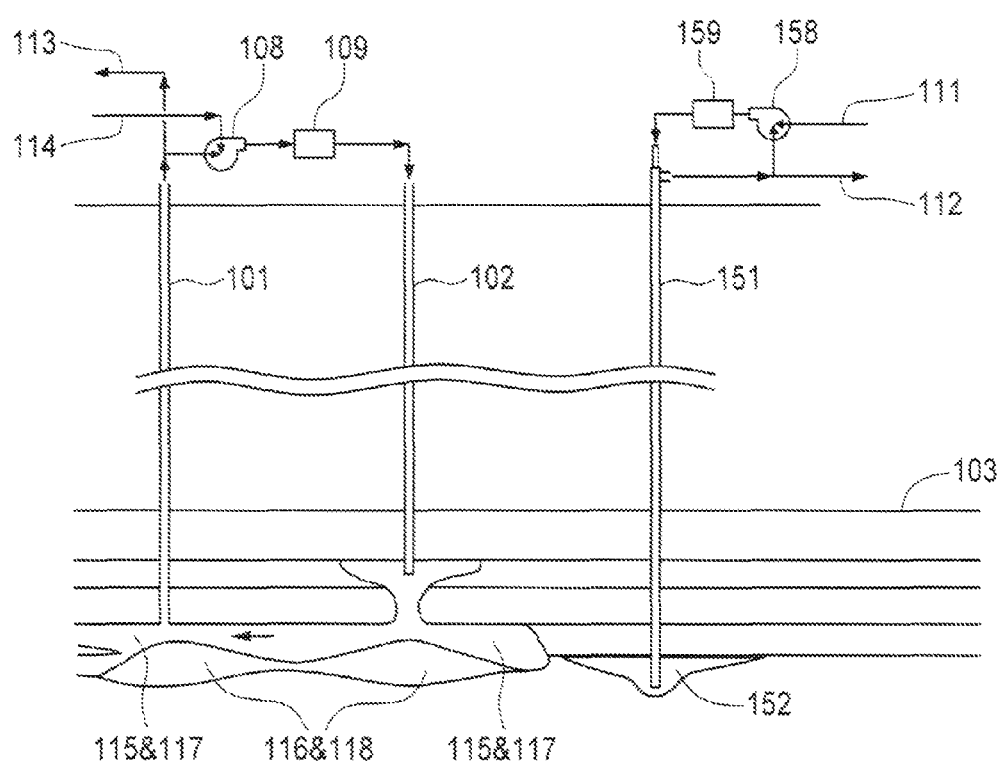
FIG. 8 is a simplified schematic view of the improved solution mining plan extended through an added well.

FIG. 8 shows the extension of a two-well cavern to a three-well cavern, but this concept can also be applied to a further-ex leaded cavern by sequentially adding wells as demonstrated. A third well (151) is drilled into the base salt to form a new salt sump (152). The sump is formed as described for the first sumps. When the new sump connects with the cavern formed by the previous well pair (115 and 117), circulation will be stopped on the sew well (151). Salt brine from the newly created sump (152) and the overlying diesel fuel layer will be displaced by production brine from wells 101 and 102. When bally displaced, a production sequence will commence on the new well (151) as shown in FIGS. 2 through 4.

The new well (151) is disconnected from pump (158) and heat exchanger (159) and connected to pump (108) and heat exchanger (109). The hot production brine will be pumped down the new well, along with one or more of the existing wells as selected by plan. The same sequence can be repeated to add fourth and fifth wells (etc.) to the new extended cavern.

Figure 6A:
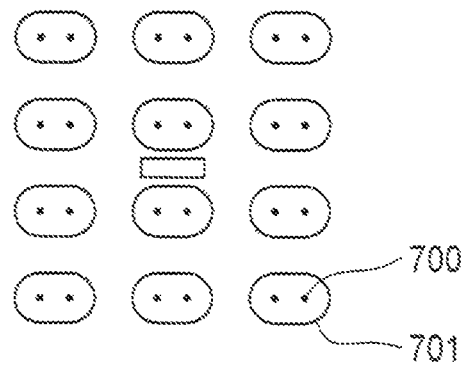
FIG. 6A is a first simplified schematic illustration of a conventional mine plan for a solution mining operation.
Figure 6B:
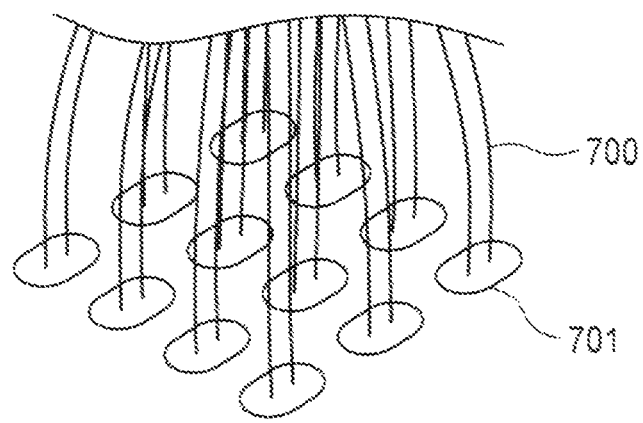
FIG. 6B is a second simplified schematic illustration of a conventional mine plan for a solution mining operation.
Figure 7A:
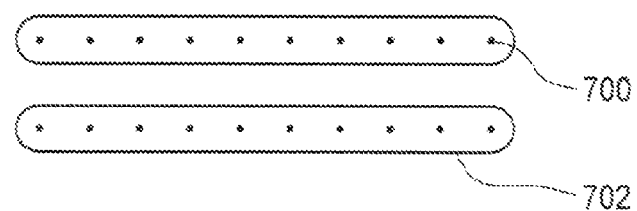
FIG. 7A is a first simplified schematic illustration of an improved mine plan for a solution mining operation in accordance with the present invention.
Figure 7B:
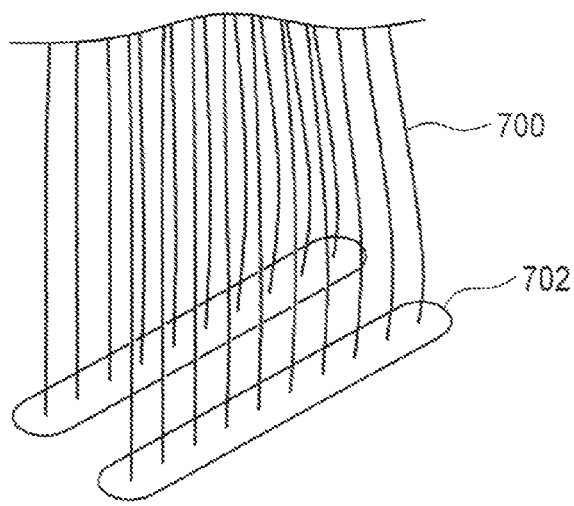
FIG. 7B is a second simplified schematic illustration of an improved mine plan for a solution mining operation in accordance with the present invention.

FIGS. 6 and 7 illustrate another difference between a conventional mining plan and the improved mining plan disclosed herein. FIG. 6 represents an existing mine plan. The holes (700) drilled from a single pod spread out to a series of caverns (701) with each cavern connected to 2 holes. FIG. 7, in contrast, represents the improved mine plan, wherein the holes (700) are drilled from a single pod (or even a series of pods) and connect to extended caverns (702).

The foregoing is considered as illustrative only of the principles of the invention. The scope of the claims should not be limited by the exemplary embodiment set forth in the foregoing, but should be given the broadest interpretation consistent with the specification as a whole.

The invention claimed is:
1. A solution mining method for recovering a target material from an at-depth soluble target layer, the target layer comprising salt and the target material, the target layer overlying a salt layer, the method comprising the steps of:
 a. drilling first and second spaced apart wells to a depth adjacent the salt layer;
 b. injecting water under an oil blanket through each of the first and second wells into the salt layer, thereby dissolving a portion of the salt layer adjacent each well;
 c. producing a resultant brine from each well;
 d. dissolving the salt layer until the dissolved portions connect to form an elongate sump between the wells and beneath the target layer, the elongate sump sized to receive a predetermined amount of liberated salt from the target layer;
 e. producing the injected water and oil blanket to the surface;
 f. terminating a well casing of the first well at a depth generally at the top of the target layer, thereby forming an end;
 g. providing the end with lateral deflection means configured to direct injected fluids generally laterally into the target layer;
 h. providing an injection brine unsaturated in sodium chloride;
 i. heating the injection brine to a desired temperature;
 j. injecting the injection brine through the first well and through the lateral deflection means to dissolve the target layer;

k. allowing the target layer to dissolve to form a target layer brine comprising the target material;
l. allowing liberated waste salt to separate out of the target layer during dissolution;
m. allowing the waste salt to accumulate in the elongate sump;
n. producing the target layer brine through the second well; and
o. recovering the target material from the target layer brine at surface;

wherein the size of the elongate sump is determined based on a calculation of total volume of ore to be mined above the elongate sump, tonnage of salt in the ore, anticipated bulk density of the dissolved portions of the salt layer, tonnage of salt that remains dissolved in residual brine upon conclusion of a mining period, amount of salt to be stored in a mined-out target zone, and an allowance for cavern closure during the mining period.

2. The method of claim 1 wherein the target material is potash.

3. The method of claim 1 wherein the injection brine comprises spent crystallizer brine.

4. The method of claim 1 wherein the desired temperature is in the range of 70 to 90 degrees C.

5. The method of claim 1 wherein at least a portion of the injected brine comprises produced target layer brine from which the target material has been recovered.

6. The method of claim 1 wherein the produced target layer brine is subjected to cooling in a crystallizer to recover the target material, the target material subsequently centrifuged and dried.

7. The method of claim 1 comprising the further steps of:
p. substantially dissolving the target layer adjacent the first well;
q. switching the second well to inject the injection brine and the first well to produce the target layer brine;
r. terminating a well casing of the second well at a depth generally at the top of the target layer, thereby forming a second end;
s. providing the second end with second lateral deflection means configured to direct injected fluids generally laterally into the target layer;
t. injecting the injection brine through the second well and through the second lateral deflection means to dissolve the target layer;
u. allowing the target layer to dissolve to form a target layer brine comprising the target material;
v. allowing liberated waste salt to separate out of the target layer during dissolution;
w. allowing the waste salt to accumulate in the elongate sump;
x. producing the target layer brine through the first well; and
y. recovering the target material from the target layer brine at surface.

8. The method of claim 1 further comprising the steps of providing a series of wells to form extended caverns, thereby increasing surface area for dissolution of potash and increasing feed flow rates.

* * * * *